United States Patent [19]
Sacherer et al.

[11] Patent Number: 5,958,231
[45] Date of Patent: Sep. 28, 1999

[54] CONTROL HEAD FOR DIVERTING FILTRATE FROM ROTARY FILTERS HAVING ADJUSTABLE FILTRATE ZONES

[76] Inventors: Wolf Sacherer, Schaftal 137, A-8044 Graz; Gerald Schnur, Dr. Tilly-Gasse 15, A-8046 Graz; Mitko Diehold, Elisabethinergasse 28, A-8020 Graz; Franz Wenzl, Attendorfberg 16, A-8151 Hitzendorf, all of Austria

[21] Appl. No.: 08/948,204

[22] Filed: Oct. 9, 1997

[30] Foreign Application Priority Data

Oct. 9, 1996 [AT] Austria .................................. 1782/96

[51] Int. Cl.⁶ ........................... B01D 33/74; B01D 33/80
[52] U.S. Cl. ........................ 210/247; 210/406; 210/486; 210/541
[58] Field of Search .................................. 210/138, 247, 210/331, 346, 347, 404, 406, 486, 541

[56] References Cited

U.S. PATENT DOCUMENTS

| | | | |
|---|---|---|---|
| 4,680,115 | 7/1987 | LaValley | 210/247 |
| 5,053,123 | 10/1991 | Clarke-Pounder et al. | 210/247 |
| 5,503,737 | 4/1996 | Luthi | 210/247 |
| 5,674,396 | 10/1997 | Wenzl et al. | 210/406 |
| 5,792,352 | 8/1998 | Scheucher et al. | 210/331 |

*Primary Examiner*—Joseph W. Drodge
*Attorney, Agent, or Firm*—Alix, Yale & Ristas, LLP

[57] ABSTRACT

The invention relates to a control head constructed for use with rotary filters for controlling separation of filtrate from the filters into adjustable filtrate zones. It is characterized by the fact that at least one filtrate separator (7) is provided, which includes a mechanism for diverting of the flow (9) from axial flow in channels that are axially arranged with respect to the axis of the filter to radial flow without causing entrainment or formation of air bubbles in the diverted flow.

14 Claims, 9 Drawing Sheets

CONTROL HEAD FOR DIVERTING FILTRATE FROM ROTARY FILTERS HAVING ADJUSTABLE FILTRATE ZONES

BACKGROUND OF THE INVENTION

The invention relates to a control head for rotary filters with adjustable filtrate zones.

Known control heads in rotary filters, for instance as described in EP 0 400 787, (U.S. Pat. No. 5,053,123) have the recurring problem of bubbles forming and air being discharged, causing the water column formed in the dropleg to break and consequently the vacuum formed to break as well. As a result, there is no more dewatering action. There have been attempts, for instance in WO 94/12261, at shaping the control head such as to collect the bubbles at one point. This did not yield the desired effect, however, because time and again, larger groups of bubbles were entrained, with the resulting above-described effect.

It is the objective of the invention to reduce the flow resistance in the control head.

This is achieved by providing at least one filtrate separator, which is furnished with means to deflect the flow. On account of the deflection of flow provided, the filtrate can advantageously be routed to the droplegs without hitting against a surface and thus causing bubbles to form by the vortex created.

A further development of the invention is characterized by the fact that at least one deflector is foreseen for diverting the flow, advantageously with several deflectors being foreseen in a parallel arrangement. Thus, flow deflection is achieved especially efficiently and by simple means.

One advantageous development of the invention is characterized by the fact that the filtrate separate runs in a deflector plate which is fixed in the casing. With such an arrangement, the flow is completely diverted whatever the position of the filtrate separator. One advantageous development of the invention is characterized by the fact that the channels formed by the means of flow deflection run into channels formed in the casing between fixed guiding plates. Thus, the filtrate flowing from the control head can be especially well deflected to the filtrate pipes, whereby flow losses are minimized.

BRIEF DESCRIPTION OF THE DRAWINGS

The invention is now explained in an exemplary manner with reference to the following the figures, where.

DESCRIPTION OF THE PREFERRED EMBODIMENTS

Figure 1:
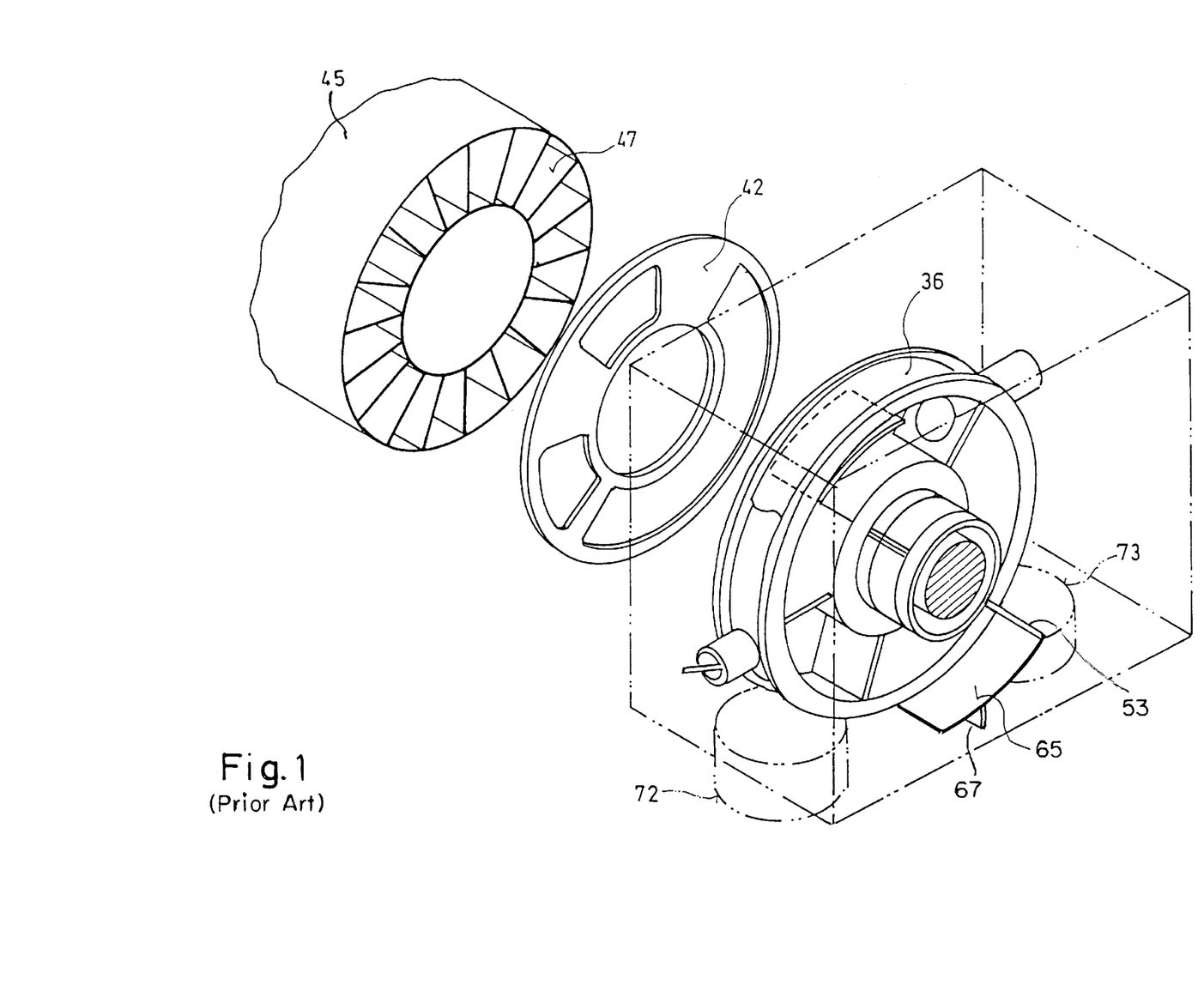
FIG. 1 is a section view through a state-of-the art control head.

The control head in FIG. 1 corresponds to FIG. 6 of U.S. Pat. No. 5,053,123, the disclosure of which is hereby incorporated by reference. FIG. 1 shows the end of the filter shaft 45 with filtrate channels 47, a control disc 42, and the internals in the control head proper 36. Specially identifiable are the filtrate discharge pipes 72, 73 and the filtrate separator 53. It can also be seen from FIG. 1 that the control head is terminated by a front plate (broken-line front).

Figure 2:
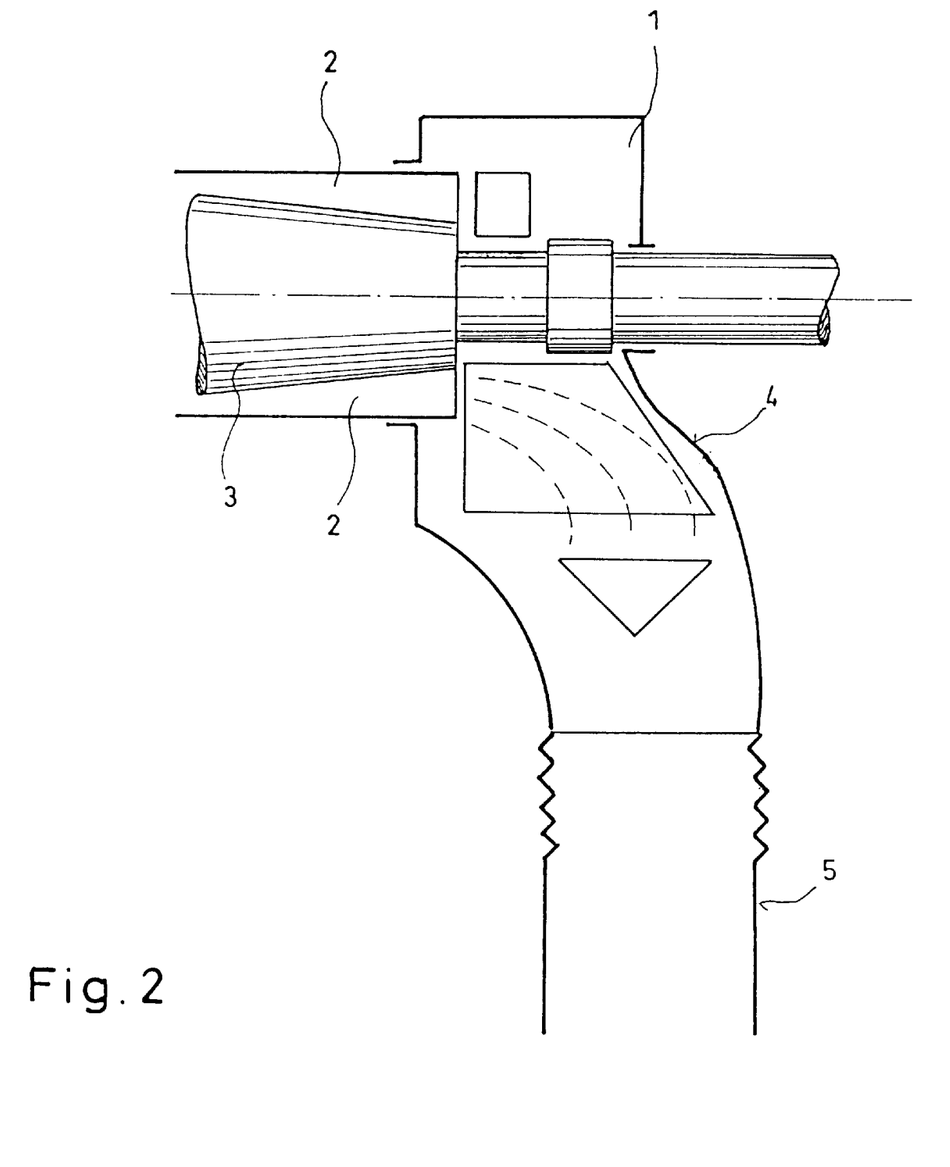
FIG. 2 shows a control head according to the invention.

FIG. 2 shows a control head according to the invention, where the control head front plate is cambered and thus smoothly deflects the filtrate toward the dropleg 5 without air bubbles forming, as occurs conventionally. The filtrate coming from the filter segments is led to the control head or filtrate head 1 via the filtrate channels 2 in filter shaft 3. The curved front 4 of filtrate head 1, in its lower section, ensures advantageous deflection of the filtrate. The filtrate is then discharged through dropleg 5, with which the vacuum is created.

Figure 3:
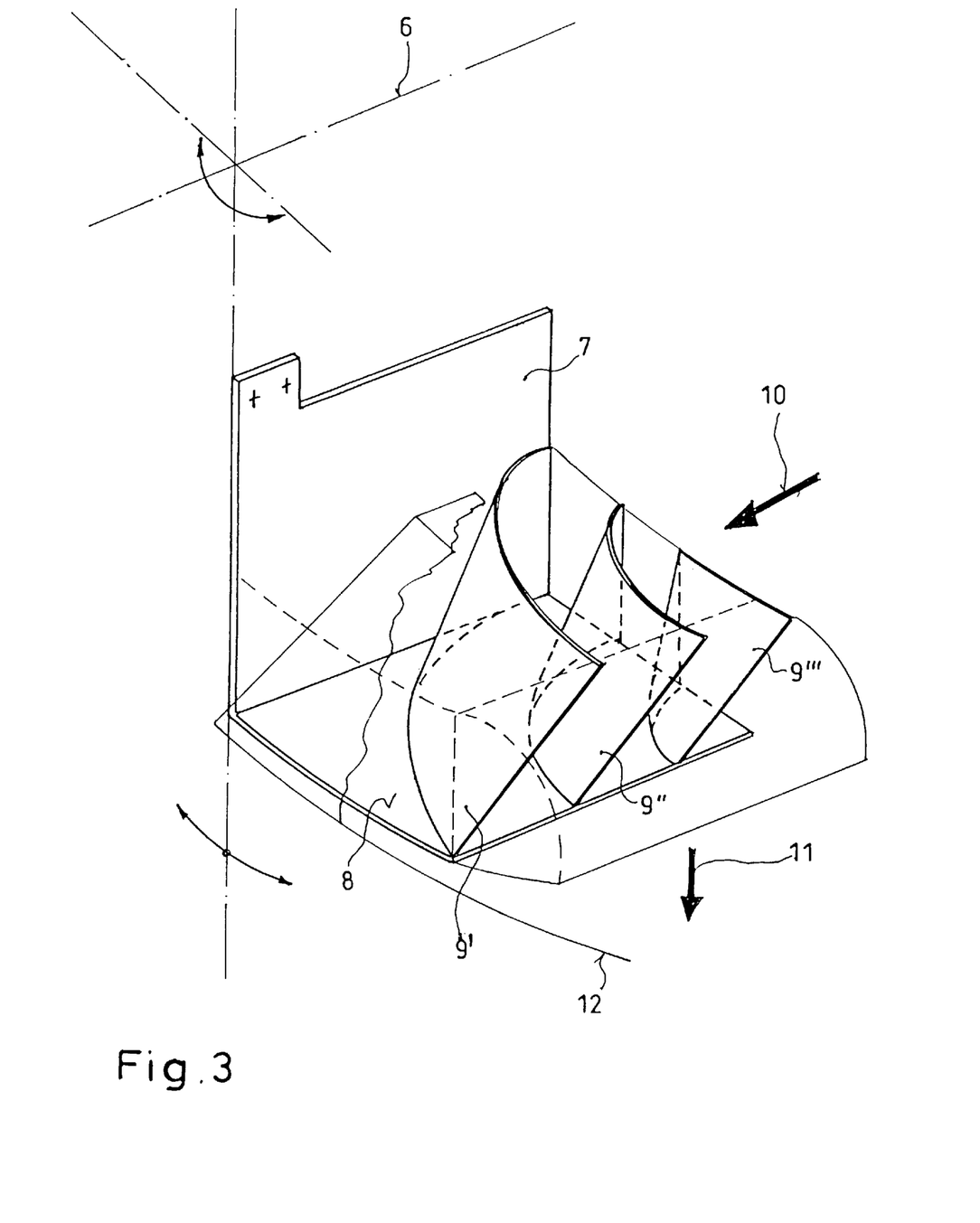
FIG. 3 depicts a three-dimensional representation of a development according to the invention.

FIG. 3 shows a three-dimensional representation of a variant of deflection in accordance with the invention. Here the filter axis 6, around which the individual filtrate pipes are arranged, is represented. The essential fact is that the movable, adjustable filtrate separator 7 with the closing plate 8 has several deflectors 9', 9", 9'" with which the flow of the filtrate can be advantageously deflected in the filtrate zone, as received from the collection channels in the shaft from the direction of arrow 10 toward the direction of arrow 11, into the dropleg, with least possible velocity losses. Filtrate separator 7 and closing plate 8 are movable along line 12.

Figure 4:
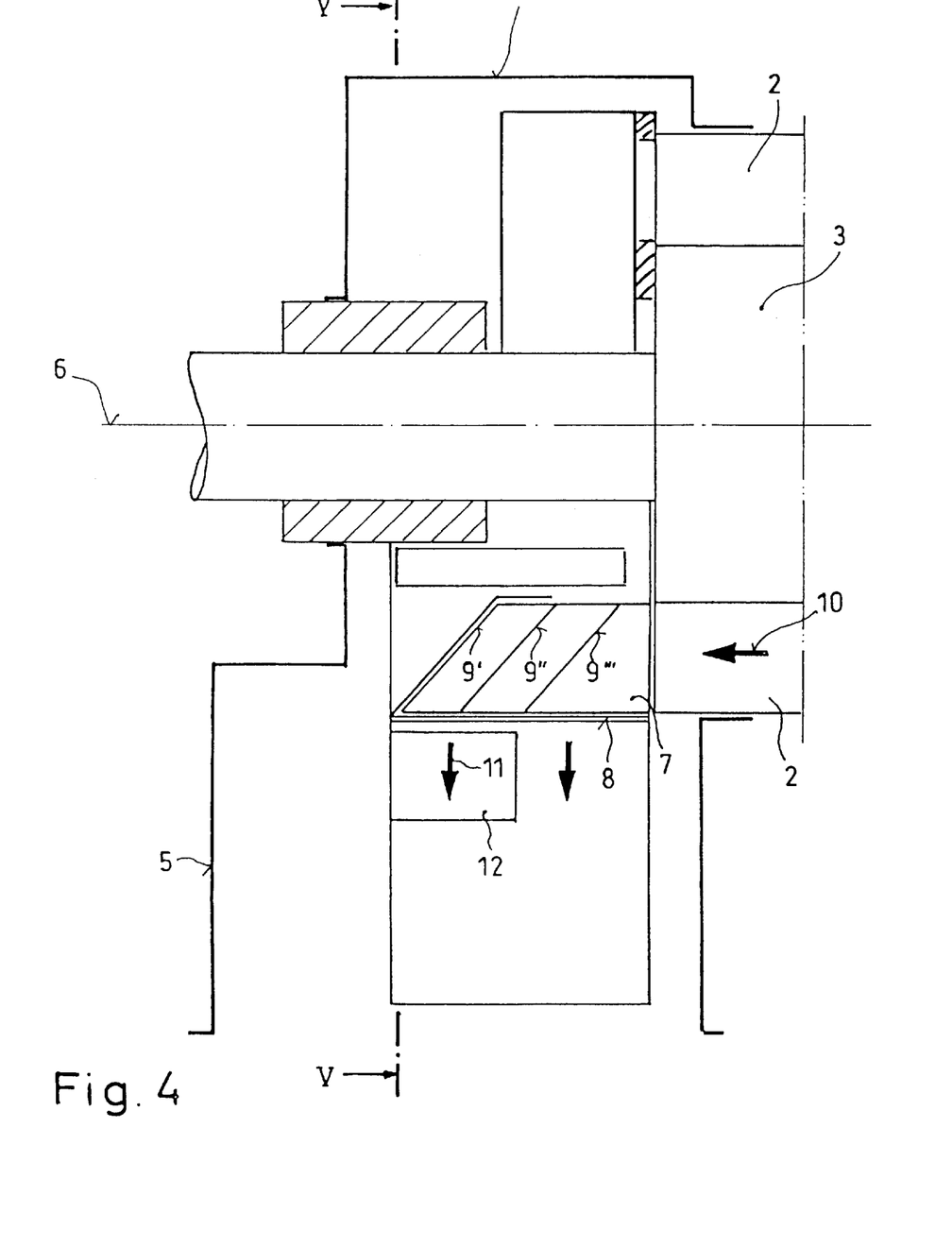
FIG. 4 is a section view through the control head by analogy to FIG. 2.

FIG. 4 shows a section through the control head according to the invention. Here, the filter shaft 3 with filter axis 6 and filtrate pipes 2 can be seen. The filtrate from filtrate pipes 2 flows in the direction of arrow 10, into control head 1, and there runs into the deflectors 9', 9" and 9'" mounted to the filtrate separator 7 and the closing plate 8. From there, it is deflected in the direction of arrow 11, into dropleg 5. Additional deflectors 12, which are fastened to dropleg 5, can further improve deflection. The rotation of the filter shaft 3 is as represented by arrow 18.

Figure 5:
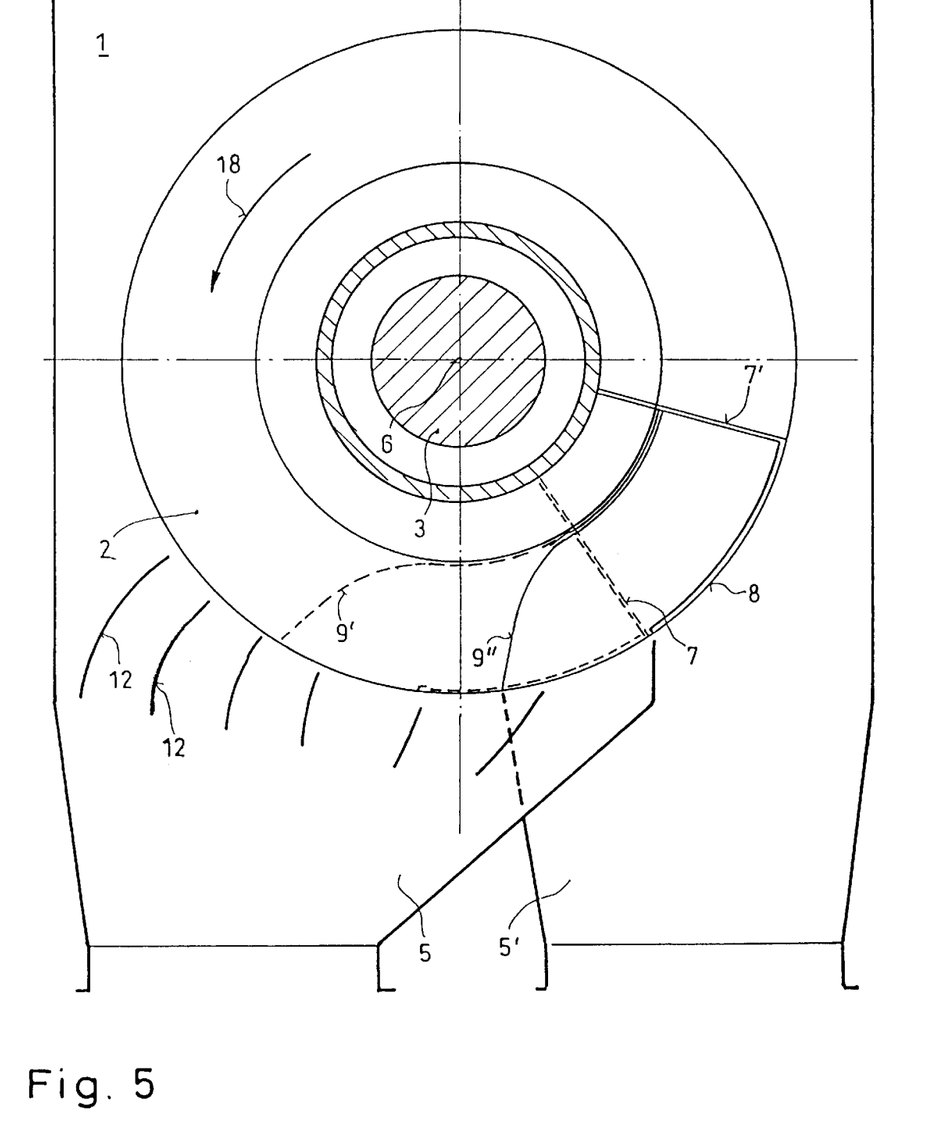
FIG. 5 is a section view along line V—V in FIG. 4.

The section through the control head along line V—V in FIG. 4 is represented in FIG. 5. Here the two end positions of the filtrate separator 7 and 7' are to be seen. In position 7', the deflector 9" is flush with the edge of dropleg 5', through which the clear filtrate is discharged. The cloudy filtrate flows through dropleg 5. In Position 7, more clear filtrate is discharged. The last of the deflectors is now in position 9' and deflects the filtrate to the other, fixed deflectors 12 and into dropleg 5. (The outlets for the individual droplegs are not represented here.)

Figure 6:
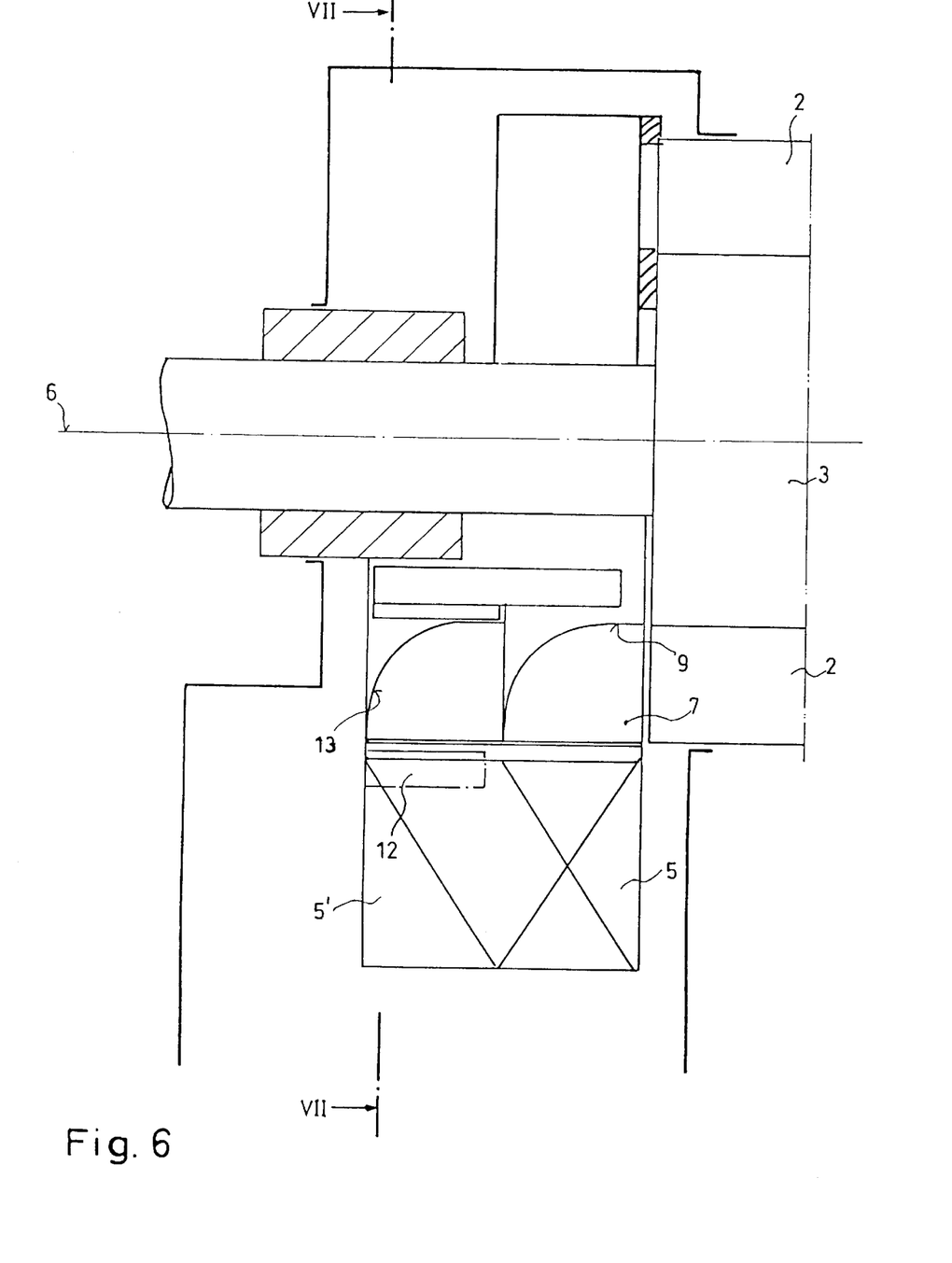
FIG. 6 shows a further variant of the invention.
Figure 7:
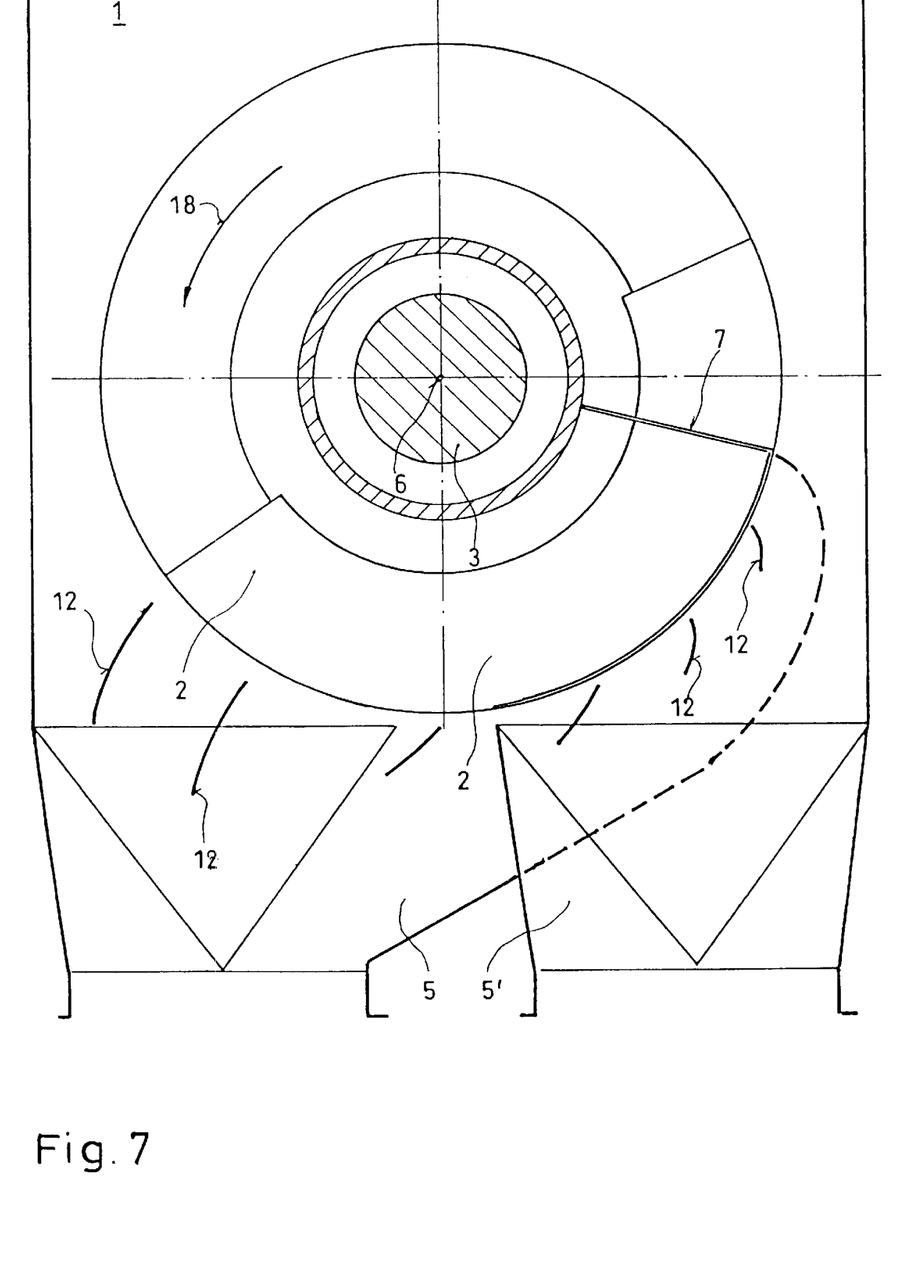
FIG. 7 is a section view along line VII—VII in FIG. 6.

In the variant of the invention represented in FIGS. 6 and 7, the connections for droplegs 5 and 5' are partly arranged one after the other when seen in the axial direction, which means that an even larger part of cloudy filtrate is discharged. The reference numbers are the same as those on the other figures. For better deflection of the cloudy filtrate, fixed deflectors 13 are foreseen here. (The outlets for the individual droplegs are not represented here.)

Figure 8:
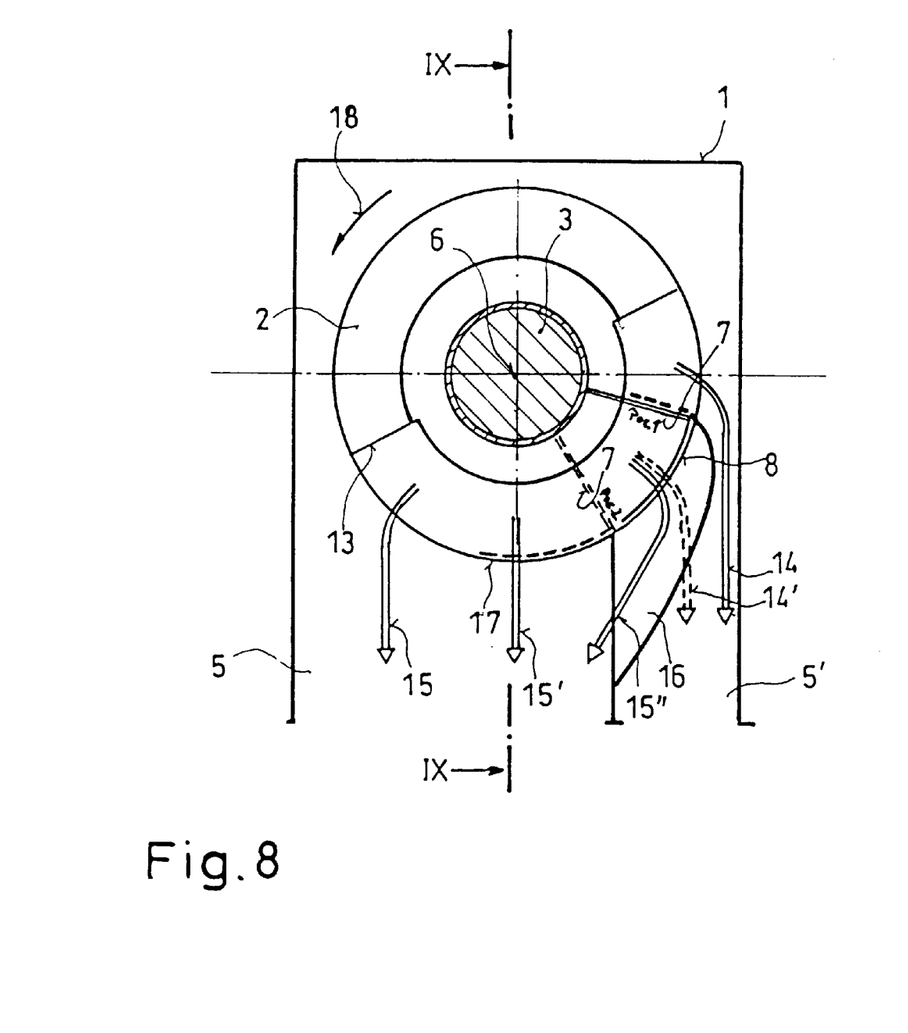
FIG. 8 shows a further variant of the invention.
Figure 9:
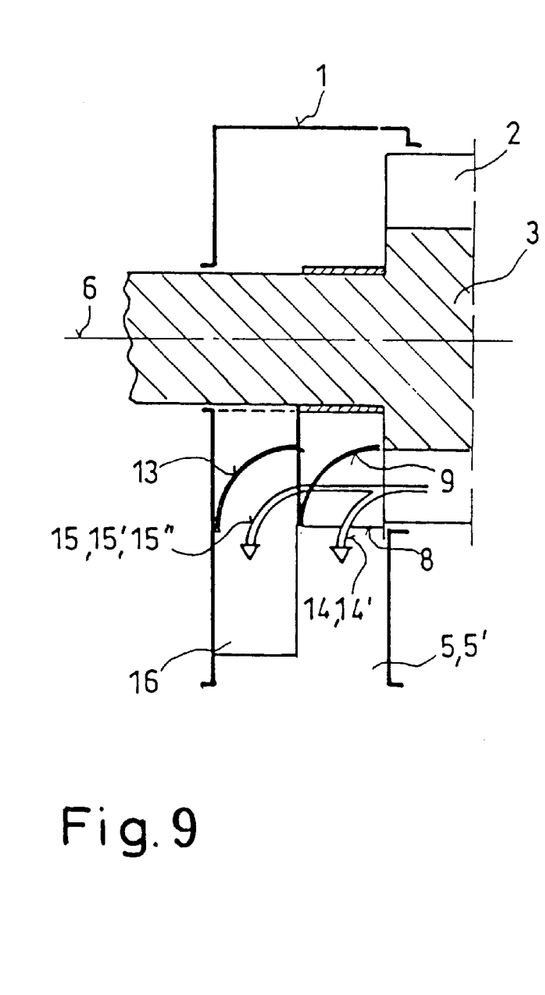
FIG. 9 is a section view along line IX—IX in FIG. 8.

FIGS. 8 and 9 represent a further variant of the invention. FIG. 8 shows two positions of the filtrate separator 7 and the resulting filtrate flows 14, 14' for the clear filtrate, and 15, 15', 15" for the cloudy filtrate. Also to be seen are the deflectors 9 mounted to the movable filtrate separator 7 and the fixed deflectors 13 in the control head in the area of the cloudy filtrate discharge. When the filtrate separator 7 is in position 1, there will be a clear filtrate flow 14 for clear filtrate, and a large portion of cloudy filtrate (arrows 15, 15' and 15"). For guiding the closing plate 8 when filtrate separator 7 is moved, a deflector plate 17 is foreseen. When the filtrate separator 7 is in position 2, the clear filtration portion is increased (shown in FIG. 8 by the broken-line arrow 14'). The cloudy filtrate flow now follows arrows 15 and 15'. The cloudy filtrate following arrow 15" is in this case routed to dropleg 5 in an overflow channel 16, which is mounted in the area of the dropleg 5'. This overflow channel 16 thus reduces the cross section of dropleg 5' in the upper part of the latter.

Figure 10:
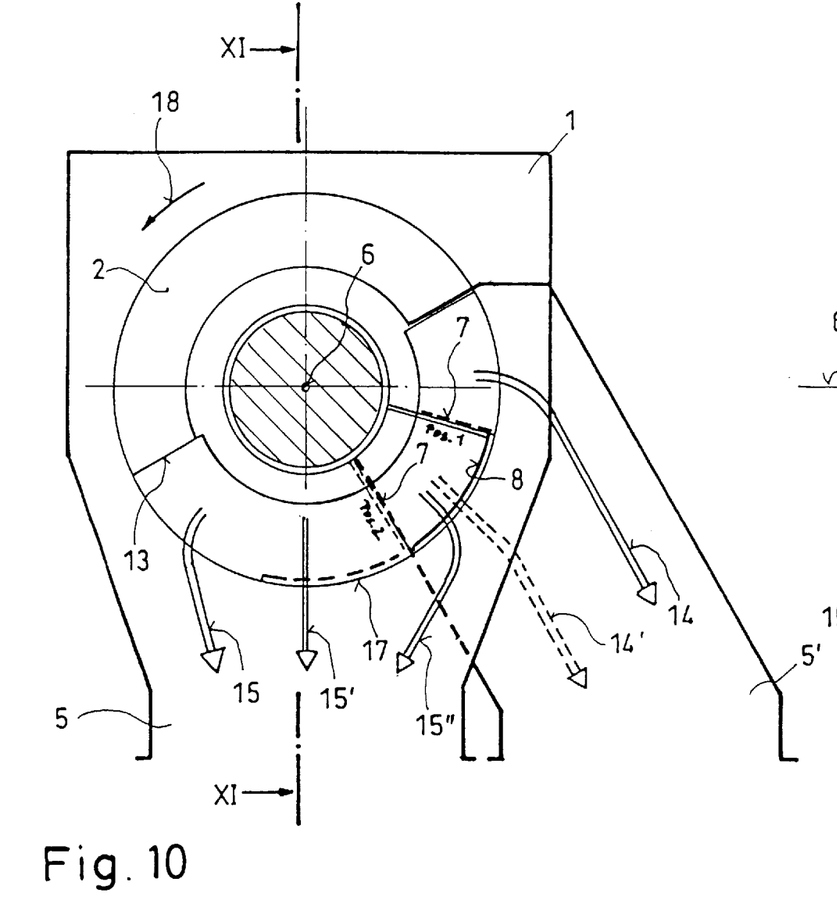
FIG. 10 shows another variant of the invention.
Figure 11:
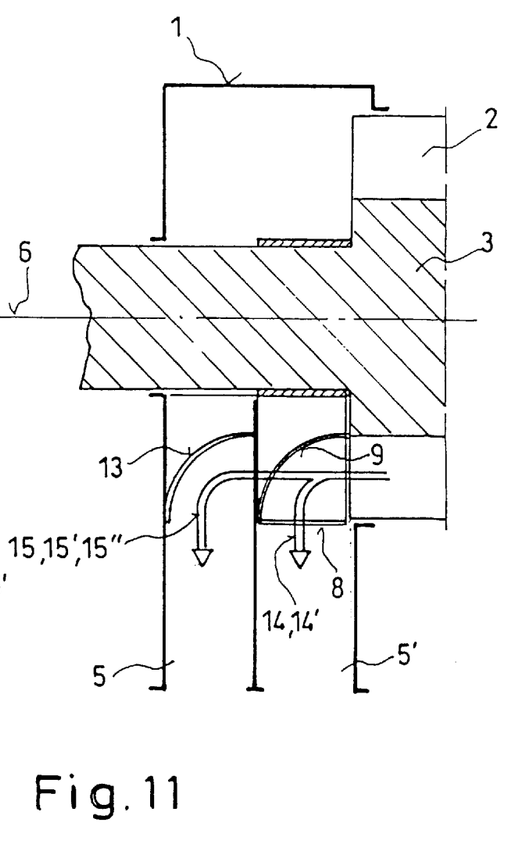
FIG. 11 is a section view along line XI—XI in FIG. 10.

To avoid this reduction of the cross section, the filtrate discharges so the droplegs can be placed one after the other in accordance with FIGS. 10 and 11. Thus, for the clear filtrate, there is an even better flow deflection involving fewer losses.

By use of the variants with which the flow deflection in the control head toward the droplegs is improved, savings can be achieved in terms of the hydraulic head (approx. 0.5 to 1 m depending on the amount of filtrate and the variant selected) due to lower pressure losses, while maintaining the vacuum created. In existing plants it is possible to achieve a higher vacuum through the use of a control head according to the invention. At a dropleg length of 5–7 m, this results in a higher filter performance of around 7% to 20%. The invention suits all types of rotary filters, but especially disc and drum filters. So-called internal filters can also be used, or disc filters where the collecting pipes are mounted on their outer diameter and knock-off the filter cake or filter mat takes place toward the inside, from where it is discharged into a tray placed in the center of the open, horizontal pipe.

We claim:

1. Control head constructed for use with for a filter rotatable about an axis and having adjustable filtrate zones, comprising a filtrate separator for producing at least one axial flow of a filtrate; and at least one deflector cooperating with said filtrate separator for deflecting said axial flow in a substantially radial direction without causing entrainment or formation of air bubbles in the deflected flow.

2. Control head according to claim 1, wherein several deflectors (9, 9', 9") are provided in a parallel arrangement.

3. Control head according to claim 2, further including a substantially hollow cylindrical casing mounted within said control head, wherein the filtrate separator (7) is guided within a deflector plate (17) which is fixed in the casing.

4. Control head according to claim 1, further including a substantially hollow cylindrical casing mounted within said control head, wherein the filtrate separator (7) is guided within a deflector plate (17) which is fixed in the casing.

5. Control head according to claim 4, wherein:
   the deflector defines at least a first substantially radial flow channel;
   at least one fixed guiding plate defines at least a second flow channel; and
   said filtrate flows from said first channel to said second channel.

6. Control head according to claim 1, further including a plurality of droplegs each having an upper part fluidly connected to said control head, wherein the upper part of the droplegs (5, 5') are arranged one after another when viewed in the axial direction.

7. Control head according to claim 6, further including a substantially hollow cylindrical casing mounted within said control head, wherein the filtrate separator (7) is guided within a deflector plate (17) which is fixed in the casing.

8. Control head according to claim 1, wherein:
   the deflector defines at least a first substantially radial flow channel;
   at least one fixed guiding plate defines at least a second flow channel; and
   said filtrate flows from said first channel to said second channel.

9. Control head according to claim 8, further including a plurality of droplegs each having an upper part fluidly connected to said control head, wherein the upper part of the droplegs (5, 5') are arranged one after another when viewed in the axial direction.

10. A rotary filter having filtering means for separating a liquid-solid mixture into solids and filtrate, means for collecting the filtrate, and a control head in fluid communication with the means for collecting the filtrate, said control head having at least a cloudy filtrate zone and a clear filtrate zone, and comprising an adjustable filtrate separator for splitting the collected filtrate into cloudy and clear filtrate flows deposited into the respective cloudy filtrate zone and the clear filtrate zone, from which the cloudy filtrate flows into a cloudy filtrate discharge dropleg and the clear filtrate flows into a clear filtrate discharge dropleg, wherein the improvement comprises: said filtrate separator includes means for deflecting filtrate flow deposited into at least one of said zones, toward the respective discharge dropleg without causing entrainment or formation of air bubbles in the deflected flow.

11. A filter rotatable about an axis comprising:
    a vacuum box including a base;
    means for providing an incoming axial flow of a filtrate including entrained air into said vacuum box;
    an adjustable filtrate splitter fluidly connected with said incoming axial flow of said filtrate within said vacuum box, said filtrate splitter separating said incoming axial flow into at least an axial flow of a substantially cloudy filtrate including entrained air and an axial flow of a substantially clear filtrate including entrained air;
    a dropleg fluidly connected to said vacuum base; and
    flow deflecting means fluidly connected with at least one of said separated flows of filtrate including entrained air for deflecting the separated flow of filtrate including entrained air from said filtrate splitter toward said base;
    wherein said deflecting means prevents the air entrained with the filtrate from separating from the flow of filtrate through formation of bubbles.

12. The rotary filter of claim 11, wherein said vacuum box includes a curved front plate and the flow deflecting means comprises said curved front plate.

13. The rotary filter of claim 11, wherein the flow deflecting means comprises a deflector mounted to the filtrate splitter.

14. The rotary filter of claim 11, wherein a closing plate is mounted to the filtrate splitter and the flow deflecting means comprises a deflector mounted to the filtrate splitter or the closing plate.

* * * * *